Figure 1:
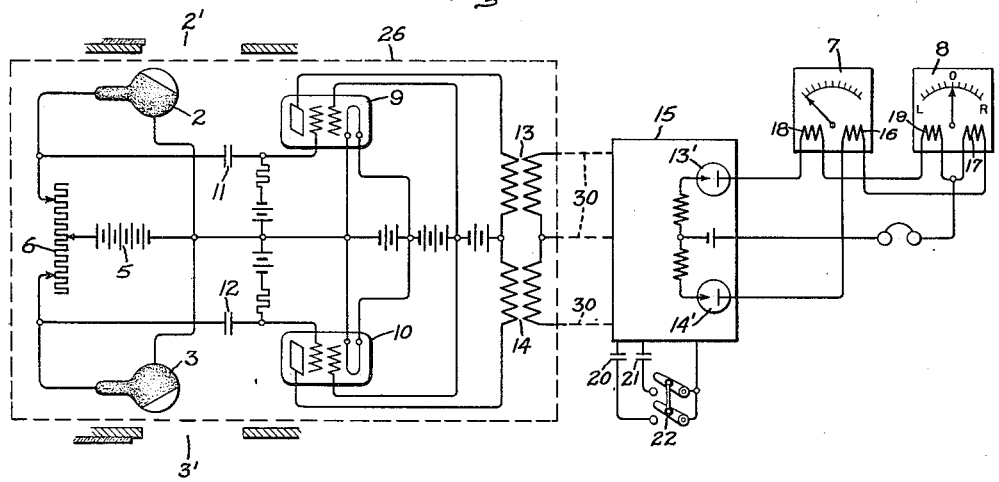

Nov. 21, 1933.                I. LANGMUIR                1,936,400

METHOD AND MEANS FOR SIGNAL TO AIRCRAFT

Filed Jan. 27, 1930

Diffused Light From Community

Fog and Clouds

Distinctively Modulated Light Beacon

Inventor:
Irving Langmuir,
by Charles V. Tullar
His Attorney.

Patented Nov. 21, 1933

1,936,400

UNITED STATES PATENT OFFICE 1,936,400

METHOD AND MEANS FOR SIGNAL TO AIRCRAFT

Irving Langmuir, Schenectady, N. Y., assignor to General Electric Company, a corporation of New York Application January 27, 1930. Serial No. 423,619

14 Claims. (Cl. 250—41.5)

My present invention relates to certain novel methods and means for guiding vehicles and, while I will describe it with particular reference to guiding aircraft, it will be understood that it is of far wider application, and that it may be used to guide water, under-water, and land vehicles as well.

One of the difficult problems in the field of aviation is that of guiding aircraft through fog and clouds. The problem arises, in part, as a result of the fact that land lights such as those of an airport or of a city become so diffused in fog or in clouds that they are not discernible to the eye, or if discernible, because of their wide diffusion do not serve as sufficient indication of the direction of the source to enable the pilot safely to bring his plane to its destination and land. The problem is obviously more difficult on a moonlight night than on a starlight night and is practically impossible under daylight conditions.

My invention relates more particularly to the use of photoelectric cells and modulated light in connection with the transmission of signals to, and the guiding of, air, and other craft, through fog and clouds. Photoelectric cells have the characteristic of great sensitivity to diffused light and in fact when used with sensitive amplifiers are far more sensitive than the naked eye. This is true in natural light conditions of both day and night. In fact, I have employed photoelectric cells of present well-known construction, to detect modulated light having an intensity of $3 \times 10^{-9}$ candles per square centimeter. This great sensitivity results from the property of photoelectric cells of producing response to the total amount of light which falls within the cell whether it be from a point source or diffused source, whereas, on the other hand, I have found that the eye requires about ten thousand times more light from a diffused source than from a point source to produce a visual response. This character of photoelectric cells renders them particularly adapted for use on aircraft as an aid in navigation through fog and clouds.

Accordingly among the objects of my invention is to provide a novel method of signaling and guiding aircraft through fog utilizing light and particularly modulated light. A further object of the invention is to provide means whereby the diffused light produced in fog and clouds either by desired signals, beacons, cities, etc. may be utilized to determine the direction and location of the source more efficiently than has heretofore been possible.

Of course the diffused light which may be present in fog and clouds may originate from many different sources and may include the light which emanates from cities and which appears as diffused lights in the sky and which may be transmitted through or reflected from the clouds above. Accordingly a further object of my invention is to provide means whereby the lights of an airport, or air beacons generally, may readily be distinguished from other lights such as the diffused light emanating from cities. This I accomplish in accordance with the present invention by modulating the lights of airports and air beacons at a different frequency from other lights. The lighting circuits of a city are commonly supplied with alternating current having a frequency of sixty cycles per second. The light emanating from the city is accordingly modulated at double this frequency or at 120 cycles. Therefore the lights employed in guiding aircraft, where they are other than the lights of a city, are modulated, in accordance with the invention, at some suitable frequency other than 120 cycles. The equipment on the craft, later to be described, may then be adjusted to respond selectively to predetermined frequencies which may be that of the air beacons, or city, or other source which it is desired to employ as a guide.

A further purpose of the invention is to provide a method and means for guiding craft through fog by means of light which is substantially unaffected by the natural light such as that of the sun, moon and stars. This I accomplish, as will later be more particularly indicated, by providing equipment on the craft which responds only to the alternating component of current flowing in the photoelectric cells employed. Since changes in the natural light of day and night are of very gradual nature, the effect upon the electric currents flowing in the photoelectric cells produced by rapidly modulated light may be readily separated from the affect of the natural sources and utilized as desired on the craft.

Figure 2:
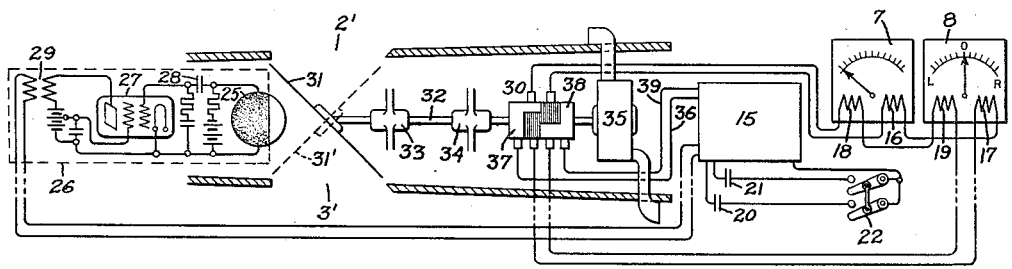
Figure 3:
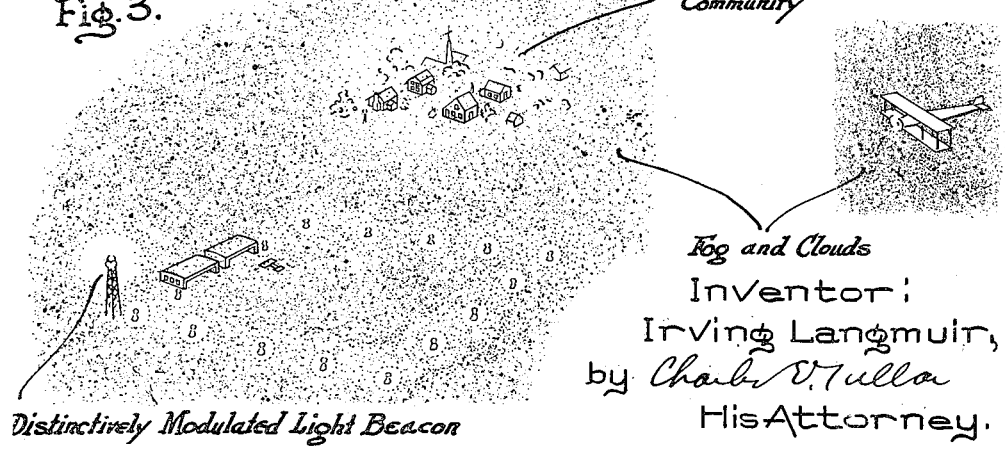

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which Fig. 1 and Fig. 2 represent different embodiments of the equipment provided in accordance with my invention which is carried on the moving craft and Fig. 3 depicts an application of my invention.

Referring to Fig. 1 of the drawing, I have represented at 2 and 3 a pair of similar photoelectric cells of well-known type which may be so located upon an aircraft as to respond to light conditions in opposite directions from the craft, or in directions symmetrical with respect to the direction of movement of the craft. These cells may, for example, be of the type disclosed in application, Serial No. 244,533, Kenneth T. Bainbridge, filed January 4, 1928. Preferably they comprise evacuated envelopes having an inner surface of oxidized silver covered with a coating of alkali metal such as caesium or rubidium, any excess or free alkali being removed from the receptacle. Of course photoelectric cells of other construction may also be employed. The cells 2 and 3 are of equal sensitivity and are provided with large transparent apertures for the reception of light. For purposes of illustration I have shown at the left of the cell 2 a window 2' through the fuselage of the craft and similarly at the right of the cells I have shown a window 3'. These windows should, of course, be of sufficient area to permit full exposure of the photoelectric cell to the external light conditions. They may, if desired, be provided with shutters to permit adjustment of the cells to equal sensitivity to these light conditions. These cells may be mounted in the fuselage and located near the tail of the craft and should be arranged to receive a maximum of light preferably in a direction somewhat forward of the direction at right angles to the direction of movement of the craft. The cells 2 and 3 are connected in a bridge arrangement with respect to the source of potential 5 by means of which they are energized, the negative side of this source of potential being connected to the cathodes of the cells and the positive side being connected at an intermediate point upon a high resistance 6 which is connected between the anodes of the two cells. The connection of the battery 5 to the resistance should preferably be variable in order to permit of other adjustment of the cells to provide against differences in sensitivity thereof, i. e. to render the two cells equally sensitive to external light conditions. Of course any other well known means for adjusting the cells to equal sensitivity may be employed as well. To permit efficient operation of the cells the opposite portions of the resistance 6 should be of value substantially equal to the internal resistance of the corresponding cell when light of average signal intensity falls upon it.

It will be apparent that the current through these cells is subject to variations due to natural light conditions such as those due to the moon, stars and sun, and are also subject to more rapid light variations such as those due to the 60 cycle lighting supply of cities, and other sources of modulated light.

At 7 and 8 I have shown a pair of instruments which may be mounted upon the instrument board of the craft, and which are connected through a suitable amplifier arrangement to respond to current flowing in the cells 2 and 3. This arrangement comprises the electron discharge devices 9 and 10, the grids of which are connected through condensers 11 and 12 respectively to the anodes of the photoelectric cells 2 and 3. These condensers isolate the devices 9 and 10 from gradual direct current variations in the cells 2 and 3 which occur due to variations in natural light and at the same time supply to these devices the alternating current component of these photoelectric currents. The output of the discharge devices 9 and 10 is supplied through transformers 13 and 14 and conductors 30 to the input of a push-pull amplifier and rectifier system 15.

The photoelectric cells and circuits connected thereto including transformers 13 and 14 are preferably located in a shielded compartment, or box, as indicated by the rectangle 26, located at the rear of the craft. The amplifier and rectifier system 15 is preferably located in the cockpit and may, if desired, comprise a plurality of stages of amplification which are tuned to respond to alternating current of desired frequency. The amplifiers of the system are of high sensitivity such as those of the screen grid electron discharge type. The last stage of each side of the push-pull circuit is adjusted to rectify the alternating current wave and produce in the output circuit thereof direct current of magnitude proportional to the intensity of the amplified alternating current, and hence proportional to the alternating component of the current flowing in the cells 2 and 3 respectively. This result may, of course, be accomplished by use of two element discharge devices in the output stages such as are indicated at 13' and 14' in the drawing or three element devices operating upon the curved portion of the characteristic.

The coils 16 and 17 of the meters 7 and 8 respectively are connected in series, and in series with the anode circuit of the rectifier 14' of one side of the push-pull system 15. Similarly the coils 18 and 19 are connected in series with the anode circuit of the opposite rectifier 13' of the push-pull system. The coils 16 and 18 of meter 7 are arranged in aiding relation and coils 17 and 19 of meter 8 are arranged in differential relation.

If desired the meters 7 and 8 may comprise vibrating reeds having windings arranged as indicated above. If desired one reed in each instrument may be utilized which vibrates in response to frequencies of modulation of airport lights and another to that of city lights. This arrangement increases the sharpness of tuning of the system. If desired the amplifier and particularly the earlies stage, or stages, of the amplifier may be tuned broadly to respond to both of these frequencies whereas the vibrating reeds each respond to a single frequency. If desired the rectifiers may then be omitted. The pilot will of course be guided on his course by vibration of one or the other of the reeds of meter 8 and will determine his arrival at his destination by the amplitude of vibration of the corresponding reed in meter 7.

I have shown in connection with the amplifier of the system 15 a pair of tuning condensers 20 and 21. Each of these condensers may be connected in parallel with the tuned circuit of a corresponding stage of the amplifier by means of a double pole switch 22, there being of course, as many condensers as there are tuned circuits in the amplifier. Thus, if the amplifier is normally tuned to respond to the frequency of modulation of city lights by closing the switch 22, it may be tuned to respond to the frequency of modulation of desired other sources such as air beacons or airport lights, for example. In this way the amplifier may be made to respond to as many different frequencies as desired.

In Fig. 3 I have shown an aircraft having equipment in accordance with my invention arranged thereon as indicated by the window 2' in the side thereof. This craft may be considered as flying at a distance from a community which is shown at the top of the left hand portion of the figure or a landing field shown at the bottom of the left portion of the figure and all of which are enshrouded in fog and clouds as indicated by the shaded area of the figure. The landing field is provided with a distinctively modulated light beacon as indicated by the legend applied thereto. Light from the beacon as well as from the community is diffused in all directions into the fog and clouds and due to its wide diffusion may be invisible to the pilot of the craft at a distance. The photoelectric equipment, however, responds to light conditions in different directions from the craft and produces an indication of the direction to the particular light source for which the equipment is adjusted to respond. The craft in Fig. 3 is shown as headed in the direction of the beacon thereby indicating that the equipment is adjusted for response to the distinctively modulated light produced by the beacon rather than to the lights of the community.

To illustrate the operation of the system let us suppose, for example, that the amplifier of the system 15 is normally tuned to respond to oscillations of a predetermined frequency as, for example, the frequency of modulation of the lights of a city which it is desired to approach, and the craft upon which the equipment is mounted is flying within a range of the city such that the photoelectric cells respond to the diffused light emanating from sources in the city. While due to twilight conditions, or due to fog or clouds, the light of the city or port, is not discernible to the pilot, the current flowing in the photoelectric cells may be found to have an alternating current component of sufficient intensity to cause operation of the meters 7 and 8.

As stated above the windings of the meter 8 are wound in differential relation with respect to each other and those of the meter 7 are wound in aiding relation. Thus, if the diffused source of light such as that of the city be at the right of the aircraft the cell 3 will produce a greater response than cell 2 and by reason of the arrangement of the windings on meter 8 the pointer thereof will be deflected toward the right. Similarly, if the source be at the left the cell 2 will produce the greater response and the pointer of the needle will be deflected toward the left whereas, if the craft is flying either directly toward or away from the city such that the intensities of light falling upon the cells 2 and 3 are equal, the pointer of the needle will remain at the center of the scale.

In order to guide his craft toward the city of his destination the pilot will always turn the craft in the direction in which the needle of the meter 8 points. That is, if the needle points to the right of the scale and he turns the craft to the right the needle deflection will decrease if the new course of the craft is more nearly in the direction toward the source. Otherwise the deflection will increase. Thus by always steering the craft in the direction of deflection of the needle the course toward the source may be followed. If it is desired to take a course directly away from the source the craft will always be turned in the opposite direction from that in which the needle points.

The intensity of the alternating current component flowing in the cells will, of course, increase as the craft approaches the source of light. Accordingly the pointer of the needle on meter 7, due to the aiding relation of the coils thereof, will be increasingly deflected toward the right as the craft approaches the source, and until it passes over the source, at which time the deflection will start to decrease thereby informing the operator that he is directly over the city which he has been approaching.

If the pilot desires to guide his craft by the lights of an airport, or by air beacons along his course, he will close the switch 22 thereby tuning the system to the frequency of modulation of the airport lights or beacons. The operation of the system will then be as before except that it will not be affected by city lights.

In accordance with the invention the lights used for air beacon purposes are of a type from which light is radiated in all directions horizontally thereby to permit as wide diffusion as possible, as distinct from lights of the horizontal or inclined beam projector type. Preferably these lights should be mounted at high elevation to avoid ground absorption and to increase the illumination of the higher strata of clouds. A vertical beam projector however has advantages for use in connection with my invention particularly in illuminating the higher strata of the atmosphere or a higher layer of clouds. Thus a low layer of fog over an airport may be dispersed or separated over a small area, as in a column, by heating from the ground. The beam may then be projected through the opening to a higher layer of clouds. The effect of such a beam will be greatly to increase the range over which light signals may be transmitted particularly when the ground is dark or uncovered with snow. Aircraft flying either above, below or within the higher layer may then be guided by the illumination resulting from the projected beam. If lamps are employed of a type in which the emitted light is substantially reduced in intensity each time that the energizing alternating current wave passes through zero, as for example, lamps of the Neon arc type in which the emitted light may fall to zero at each half cycle, the frequency of modulation may be made very high. I prefer, however, to use comparatively low frequencies of modulation.

The indication of meters 7 and 8 will of course not be affected by extraneous sources of light having modulations of frequency other than that to which the amplifier of the system 15 is tuned to respond. Since condensers 11 and 12 prevent gradual direct current variations from affecting the amplifier it will be apparent that sources of constant intensity will not affect the system. Thus the operation of the system is not affected by the degree of darkness of night or by unmodulated artificial light sources.

It may occur in daytime operation, however, that the current flowing in the photoelectric cells is so great that due to the external resistance of the circuit the drop in voltage across the cell is insufficient to maintain the sensitivity of the cell to external light conditions. To correct this difficulty the connections of the different cells to the opposite portions of resistance 6 are shown in the drawing as variable. The variation of these resistances may, of course, be effected in any suitable way by the pilot but it will be found necessary to change the resistance only to correct for wide variations in natural light conditions such as that between day and night. During daytime operation the external resistance in the circuit of the cell will be made less than at night thereby to cause more voltage to be distributed upon the cells.

Referring to Fig. 2, I have shown a further embodiment of the invention employing a single photoelectric cell. This photoelectric cell, which I have designated 25, is arranged in the tail of the craft in the shielded compartment or box which I have indicated by the dotted rectangle 26. In this compartment is also located, as in Fig. 1, an amplifier 27 having its grid circuit connected through a condenser 28 to the opposite terminals of the photoelectric cell whereby variations in the current of the photoelectric cell are amplified by the amplifier 27 and supplied through an output transformer 29 to the tuned amplifier and rectifier system 15, the output of which is supplied through a distributor 30 to the meters 7 and 8 which are mounted on the instrument board of the craft.

The photoelectric cell 25 is alternately subjected to the external light conditions upon opposite sides of the craft. This may be accomplished by means of a suitable reflecting surface or mirror 31 which is arranged obliquely of the craft and in front of the photoelectric cell. This mirror is mounted upon a rotating shaft 32 mounted in bearings 33 and 34 and driven by means of any suitable motor such as a wind turbine 35. Thus, in the position shown in the drawing, light from the window 3' is reflected into the cell by the mirror 31 and light from the window 2' is excluded therefrom by the same mirror. When the mirror rotates through a half revolution light from the opposite side of the craft is reflected into the photoelectric cell and light from the window 3' is excluded, thus the mirror 31 serves not only to reflect the light alternately from the windows 2' and 3' into the cell but it also acts as a shutter to exclude light from the opposite direction.

The distributor 30 is mounted upon the shaft 32 and accordingly is driven synchronously therewith. This distributor is of such a construction that the output from the rectifier is supplied alternately to the windings 16 and 17; and 18 and 19, that is, with the mirror 31 in the position shown in the drawing the circuit including the output of the rectifier extends through conductor 36, conducting portion 37 of the distributor, windings 18 and 19 in series, conducting portion 38 of the distributor, and conductor 39. When the mirror is rotated through a half revolution so that light from the window 2' is reflected into the photoelectric cell the circuit including the output of the rectifier will extend through conductor 36, conducting portion 37 of the distributor, windings 17 and 16 in series, and conducting portion 38, and conductor 39, to the opposite side of the rectifier. The windings 17 and 19 are wound in differential relation as before thereby to cause the meter to respond to the difference in light intensities on opposite sides of the craft. Similarly the windings of the meter 7 are wound in aiding relation as before.

The amplifier and rectifier arrangement may be located either in the tail of the craft or in the cockpit, but preferably the tuning switch 22 which is for the purpose described in connection with Fig. 1 will be mounted in easy access of the pilot.

It will, of course, be understood that equipment provided in accordance with my invention may be employed for signaling purposes as well as for purposes of navigation. For purposes of illustration I have shown a pair of headphones connected in the common conductor of the output of the amplifier system 15 of Fig. 1 whereby the operator may receive signals in the form of Morse code for example which may be transmitted by interruptions in the source of light. Thus, for example, each airport may periodically interrupt the source of supply to its air beacons in accordance with a code combination corresponding to the particular station. Thus, the pilot as he approaches a particular airport may by means of his headphones and the telegraphic code ascertain the port which he is approaching.

While I have described my invention with particular reference to light of frequency within the visible portion of the spectrum it, of course, is in no way limited thereto and it may be found that, particularly for daytime operation, the use of light in the invisible portion of the spectrum such as infra red or ultra violet may have advantages. The photoelectric cells employed will then be of a type which respond particularly to light in these portions of the spectrum.

While I have shown particular embodiments of my invention it will, of course, be understood that I do not wish to be limited thereto since many modifications may be made both in the circuit arrangement and in the instrumentalities employed and I, therefore, contemplate by the appended claims to cover all such modifications as fall within the true spirit and scope of my invention.

What I claim as new and desire to secure by Letters Patent of the United States, is:

1. The method of guiding craft through a medium to a destination at which light is produced in the medium, which includes varying electric currents on the craft in accordance with light conditions in the medium in different directions from the craft and guiding the craft in accordance with the relative magnitude of said currents.

2. The method of guiding craft through a medium to a destination at which light is produced in the medium, which includes varying a plurality of electric currents on the craft in accordance with light conditions in the medium in different respective directions from the craft and guiding the craft in accordance with the relative magnitude of said currents and in accordance with the intensity of at least one of said currents.

3. The method of guiding craft through media to a destination at which light of predetermined character is diffused into the media which includes producing an electric current on the craft in accordance with light conditions in different directions from the craft, separating the resulting currents produced in accordance with light of said predetermined character from the currents produced in accordance with light in the media of other character and guiding the craft in accordance with the relation between the said currents produced in accordance with said light of predetermined character.

4. The combination, on an aircraft, of an indicating device, and means for supplying to said indicating device a plurality of electric currents, means to vary the intensity of each of said currents in accordance with the intensity of light in a certain direction from the craft, different currents being varied in accordance with the intensity of light in different directions from the craft, and said indicating device being arranged to produce an indication in accordance with the relation between said currents.

5. The combination, on an aircraft, of a plurality of indicating devices, and means for supplying to each of said indicating devices a plurality of electric currents, means to vary each of said currents in accordance with light conditions in a certain direction from the craft and different of said currents being varied in accordance with light conditions in different directions from the craft, and one of said indicating devices being arranged to produce an indication in accordance with the sum of said currents and another in accordance with the difference between said currents.

6. The combination, on a vehicle, of a pair of photoelectric cells arranged on the vehicle to respond to light conditions in different directions therefrom, and means for producing an indication dependent upon the difference between the unsteady components of the currents in said cells, and means for preventing the steady or slowly varying components of said currents from affecting said indication, whereby said vehicle may be guided by said indication to a source of modulated light.

7. The method of determining the direction of a source of light from craft moving through media subjected to light from said source, said light having a frequency within the frequency range of human vision and which is so widely diffused through the media that the direction of the source of light cannot be determined by the eye, which includes producing photo-electric effects upon the craft in accordance with the intensity of light in different directions from the craft and determining the direction of the source of light from the relative magnitude of said photoelectric effects.

8. The method of guiding aircraft with reference to a city so distant that light emanating therefrom is not visible to the eye, which includes producing an electric current upon the craft in accordance with the light conditions in the atmosphere about the craft resulting from diffusion through the atmosphere of light emanating from sources employed for illumination of the city, and producing an indication dependent upon the amplitude of variation of said current corresponding to the variations of said city lights and independently of other variations of said current.

9. The method of guiding aircraft to a point along a course extending in proximity to a city, which includes diffusing light into the atmosphere about said point, modulating said light in a manner distinctive from the modulation of the light diffused into the atmosphere from sources employed for illumination of the city, producing a photo-electric current in accordance with diffused light conditions in the atmosphere about the craft, said photo-electric current having modulation components of a frequency determined by the lights of said city, or said point, or both, dependent upon the position of said craft and guiding the craft in accordance with the modulation components of said photo-electric current.

10. In a system for guiding aircraft along a course extending in proximity to one or more city or village communities, the combination of means at a stationary point for diffusing light into the atmosphere about said point, means for modulating said light in a manner distinctive from the modulation of the light emanating from sources employed for illumination of any of said communities along said course, a photo-electric cell upon the craft subject to diffused light conditions about the craft, an indicating device connected selectively to respond to modulations of current in said photo-electric cell produced by light diffused into the atmosphere at said point or by the lights of any of said communities.

11. In a system for guiding craft with reference to a point, the combination of a source of light at said point, means for modulating said light at a frequency different from the modulation of light diffused into the atmosphere from sources employed for illumination of outlying communities, a photo-electric cell arranged on the craft and subjected to light conditions in the atmosphere about the craft, an indicating means, an amplifier arranged to supply current to said indicating means in accordance with the modulations of current in said photo-electric cell, and means selectively to tune said amplifier to operate either at the frequency of modulation of light produced at said point or modulations of light emanating from sources employed for illumination of said communities.

12. The method of directing craft through media subject to one or more light sources of constant intensity which includes producing in said media light having predetermined modulations, producing an electric current upon said craft in accordance with light conditions in said media in different directions from the craft, separating the modulated components from the constant component of said current and guiding the craft in accordance with the relative intensities of the modulated components produced in accordance with light conditions in said different directions.

13. The method of guiding craft through media subject to diverse light sources, one of which light sources is of known character, which includes producing an electric current in accordance with light conditions in said media in different directions from the craft, separating the current components produced in accordance with said light source of known character from the current produced in accordance with light sources of other character and comparing the intensities of said current components produced in accordance with said light sources of known character when said electric current is produced in accordance with light conditions in different directions.

14. The combination, on a vehicle, of an indicating device having a pair of differentially related actuating windings, means for energizing one of the windings of said pair in accordance with light conditions in a certain direction from the vehicle, and means for energizing the other winding of said pair in accordance with said light conditions in a different direction from said vehicle.

IRVING LANGMUIR.